(12) United States Patent
Sevelsted et al.

(10) Patent No.: US 9,902,422 B2
(45) Date of Patent: Feb. 27, 2018

(54) HYDRAULIC STEERING DEVICE

(71) Applicant: Danfoss Power Solutions APS, Nordborg (DK)

(72) Inventors: Nils E. Sevelsted, Soenderborg (DK); Morten Hoeck Petersen, Soenderborg (DK); Helle Bonde Rasmussen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 384 days.

(21) Appl. No.: 14/368,365

(22) PCT Filed: Dec. 10, 2012

(86) PCT No.: PCT/EP2012/005120
§ 371 (c)(1),
(2) Date: Jun. 24, 2014

(87) PCT Pub. No.: WO2013/097926
PCT Pub. Date: Jul. 4, 2013

(65) Prior Publication Data
US 2014/0345266 A1    Nov. 27, 2014

(30) Foreign Application Priority Data

Dec. 27, 2011 (EP) .................... 11010236

(51) Int. Cl.
*B62D 5/097* (2006.01)
*B62D 5/32* (2006.01)

(52) U.S. Cl.
CPC ............. *B62D 5/32* (2013.01); *B62D 5/097* (2013.01)

(58) Field of Classification Search
CPC .................. B62D 5/097; B62D 5/32
See application file for complete search history.

(56) References Cited

U.S. PATENT DOCUMENTS

| 4,595,071 A | 6/1986 | Mehren |
|---|---|---|
| 4,621,704 A | 11/1986 | Kozuka |

(Continued)

FOREIGN PATENT DOCUMENTS

| CN | 1034512 A | 8/1989 |
|---|---|---|
| CN | 1201924 A | 12/1998 |

(Continued)

OTHER PUBLICATIONS

International Search Report for PCT Application No. PCT/EP2012/005119 dated Feb. 26, 2013.

(Continued)

*Primary Examiner* — F. Daniel Lopez
(74) *Attorney, Agent, or Firm* — McCormick, Paulding & Huber LLP (57) ABSTRACT

A hydraulic steering device is provided comprising a supply port arrangement having a supply port (P) and a return port (T), a working port arrangement having two working ports (L, R), direction valve means (2) arranged between said supply port arrangement and said working port arrangement, at least two fluid meters (3, 4), each of said fluid meters (3, 4) having a movable metering element (12, 15), said metering elements (12, 15) being connected by a shaft (5), said shaft (5) having an axis, selector valve means (6) being provided, said selector valve means (6) in a first position arranging said fluid meters (3, 4) hydraulically in parallel and in a second position shutting off one of said fluid meters (3, 4), said selector valve means (6) having a valve element (20) shiftable in an direction parallel to said axis. It is an object to reduce wear in said hydraulic steering device in a simple manner. To this end said selector valve means (6) are arranged between said two fluid meters (3, 4), said shaft (5) extending through said valve element (20).

18 Claims, 4 Drawing Sheets

(56) References Cited

U.S. PATENT DOCUMENTS

| | | |
|---|---|---|
| 4,644,846 A | 2/1987 | Kozuka |
| 4,715,464 A | 12/1987 | Nakamura et al. |
| 5,515,938 A | 5/1996 | Haga et al. |
| 5,620,026 A | 4/1997 | Stephenson et al. |
| 5,638,912 A | 6/1997 | Haga et al. |
| 5,651,423 A | 7/1997 | Haga et al. |
| 5,806,561 A * | 9/1998 | Pedersen ............... B62D 5/097 137/565.33 |
| 5,819,532 A | 10/1998 | Wang et al. |
| 5,836,418 A | 11/1998 | Kim |
| 5,878,780 A | 3/1999 | Thomas |
| 5,960,694 A | 10/1999 | Thomas et al. |
| 6,544,018 B2 * | 4/2003 | Heckel ................ F04C 2/104 418/60 |
| 2001/0004032 A1 | 6/2001 | Zenker et al. |
| 2002/0170769 A1 | 11/2002 | Sakaki et al. |
| 2008/0010982 A1 | 1/2008 | Ulbricht et al. |
| 2008/0116001 A1 | 5/2008 | Graeve et al. |
| 2008/0202842 A1 | 8/2008 | Shevket |
| 2009/0199915 A1 | 8/2009 | Novacek et al. |
| 2010/0258375 A1 | 10/2010 | Miller |
| 2014/0298792 A1 | 10/2014 | Andersen et al. |
| 2014/0374187 A1 | 12/2014 | Arbjerg et al. |
| 2015/0158522 A1 | 6/2015 | Thayer |

FOREIGN PATENT DOCUMENTS

| | | |
|---|---|---|
| CN | 1206382 A | 1/1999 |
| CN | 1323709 A | 11/2001 |
| CN | 201297306 Y | 8/2009 |
| CN | 201484482 U | 5/2010 |
| CN | 101952159 A | 1/2011 |
| DE | 2228531 C2 | 7/1982 |
| DE | 195 11 501 A1 | 10/1996 |
| DE | 10257130 A1 | 7/2004 |
| DE | 10252215 B3 | 10/2004 |
| DE | 102005035171 A1 | 2/2007 |
| EP | 0096963 A2 | 12/1983 |
| EP | 1 212 231 B1 | 6/2002 |

OTHER PUBLICATIONS

International Search Report for PCT Application No. PCT/EP2012005121 dated Feb. 28, 2013.
European Search Report for European Application No. EP11010247 dated Jul. 9, 2012.
European Search Report for European Application No. EP11010248 dated Jul. 9, 2012.
European Search Report for European Application No. EP11010236 dated Jul. 9, 2012.
International Search Report for PCT Serial No. PCT/EP2012/005120 dated Apr. 24, 2013.

* cited by examiner

HYDRAULIC STEERING DEVICE

CROSS REFERENCE TO RELATED APPLICATIONS

This application is entitled to the benefit of and incorporates by reference subject matter disclosed in International Patent Application No. PCT/EP2012/005120 filed on Dec. 10, 2012 and European Patent Application 11010236.5 filed Dec. 27, 2011.

FIELD OF THE INVENTION

The present invention relates to a hydraulic steering device comprising a supply port arrangement having a supply port and a return port, a working port arrangement having two working ports, direction valve means arranged between said supply port arrangement and said working port arrangement, at least two fluid meters, each of said fluid meters having a moveable metering element, said metering elements being connected by a shaft, said shaft having an axis, selector valve means being provided, said selector valve means in a first position arranging said fluid meters hydraulically in parallel and in a second position shutting off one of said fluid meters, said selector valve means having a valve element shiftable in a direction parallel to said axis.

BACKGROUND

Such a hydraulic steering device is known from DE 195 11 501 A1. When a vehicle equipped with such a hydraulic steering device is driven in a so called "normal mode" the two fluid meters are arranged in parallel. In this case steering of the vehicle can be effected by rotating the steering wheel over a small angle. In a so called "emergency steering mode" there is no supply of hydraulic fluid under pressure. In this case one of the fluid meters is operated as auxiliary pump. Steering of the wheels of the vehicle requires a larger rotation of the steering wheel, however, with a reduced torque. Automatic switching between the two modes can be realized by means of the pressure at the supply port and by means of a spring acting in the opposite direction.

The design known from DE 195 11 501 A1 requires a rather short cardan shaft between the two fluid meters. This gives rise to some problems, for example in connection with a relative high input torque as the cardan shaft does not have many opportunities for "moving". This can also cause scrap problems during manufacturing, as the parts of the fluid meters must fit well together. Furthermore, a lot of special components, e.g. special housing, special bolts etc., are necessary because the hydraulic fluid must flow around the bolts, which again causes that the bolts do not guide well enough, so that guiding pins etc. must be used.

In order to overcome this problem it is known from US 2009/0199915 A1 to place the selector valve between the two fluid meters. In this steering device the selector valve means comprises a rotating valve element which is arranged between the two fluid meters. This makes the construction complicated. When the two fluid meters and the selector valve between the fluid meters are clamped together with a high force the rotating valve means is no longer able to be rotated. When the clamp forces are reduced it is difficult to have a steering device without leakages. For a leakage proof steering device parts must be produced with a rather high accuracy.

Other steering devices are known from EP 1 212 231 B1 in which the selector valve means is arranged in a housing surrounding the cardan shaft. This requires additional space for the selector valve means.

SUMMARY

The object underlying the invention is to reduce wear in said hydraulic steering device in a simple manner.

This object is solved in that said selector valve means are arranged between said two fluid meters, said shaft extending through said valve element.

This design combines the advantages of using a sliding valve element which can be moved substantially parallel to the axis of the shaft with the advantage of arranging the selector valve means between the two fluid meters allowing the use of a rather long shaft. In this case it is possible practically to use only standard components for manufacturing. The accuracy for fitting the parts together (gear wheel set and cardan shaft) can be reduced. The overall length of the hydraulic steering device can be kept almost the same as before. It is rather simple to get a fluid tight hydraulic steering device.

In a preferred embodiment said selector valve means comprise a housing, said housing having a bore, said valve element being arranged in said bore, said bore providing a stop for said valve element, wherein removable holding means are provided preventing said valve element from leaving said bore. When the holding means are mounted in the housing the valve element is trapped between the stop in the bore and the holding means. The stop and the holding means have a distance from each other allowing a movement of the valve element between at least two positions, one of these positions being assigned to normal steering mode and the other position being assigned to emergency steering mode. The selector valve means can be premounted by inserting the valve element into said housing and mounting the holding means. The selector valve means thus produced can be tested and only if it works in an acceptable manner it is used for the further production of the hydraulic steering device.

Preferably said holding means is a nut. A nut can easily be fixed to the housing so that the mounting operation is rather simple.

Preferably said nut comprises an outer thread being threaded in an inner thread in said housing. In this way it is possible to insert the nut into the housing so that the housing can be designed with plane surfaces at two opposite ends in axial direction, i.e. in an direction parallel to the axis of the shaft. This makes it simple to insert the selector means between the two fluid meters.

In a preferred embodiment said nut comprises a torque transmitting geometry in a face opposite said valve element. A tool can be used engaging this torque transmitting geometry for turning the nut in the housing. This design does not need any parts protruding over an end face of the selector valve means.

Preferably said valve element rests against said holding means in a normal steering mode. The position of the holding means defines the position of the valve element in the normal steering mode which in operation is the most preferred mode. Therefore, the holding means can be used for a fine adjustment of the position of the valve element.

In a preferred embodiment spring means are provided between said holding means and said valve element. The spring means are used to bring the valve element in the correct position for emergency steering mode, i.e. in a mode in which the pressure at the supply port has disappeared or decreased to a level which does not allow steering.

In a preferred embodiment said stop stops a movement of said valve element leaving a gap between said valve element and a fluid meter next to said valve element in emergency steering mode. This prevents the valve element from pressing against the fluid meter which in turn would cause an increased wear. The force created by the spring means is completely absorbed by the housing of the selector valve.

Furthermore it is preferred that said holding means is fixed in said housing leaving a distance between said holding means and a fluid meter next to said valve element in normal steering mode. This distance prevents the selector valve means from exerting a pressure on the other fluid meter which would cause wear as well.

Preferably said valve element comprises a bore having a step, said spring means resting against said step. This is a rather simple design allowing the shaft to pass through said valve element and at the same time allowing a sufficient pressure to be exerted by the spring means.

In a preferred embodiment said spring means comprise a plurality of coil springs, said coil springs being distributed in circumferential direction. In this way the force created by said spring means can be made sufficiently large and it can be distributed uniformly in circumferential direction so as to prevent the valve element from tilting in said valve housing.

In another preferred embodiment said spring means comprise a single coil spring surrounding said shaft. This is a simpler design. The handling of the spring means during mounting requires the insertion of a single spring into the valve element only.

Preferably rotation preventing means are provided preventing rotation of said valve element in said housing. The valve element should in one position connect openings in an inner wall of the bore of the housing in which the valve element is positioned. These openings are assigned to pressure chambers defined in the two flow meters. Therefore, the openings should have a fixed position in circumferential direction. Therefore, it is an advantage to prevent said valve element from rotating.

Alternatively or additionally said valve element comprise a number of grooves in an outer surface, said grooves having a width in circumferential direction, said housing comprising a corresponding number of openings in an inner surface facing said outer surface, wherein a distance between openings neighbouring each other is larger than said width. In this case rotation of the valve element relative to said housing allows still steering in a case of failure since there is no possibility that a short circuit is created by said rotation.

BRIEF DESCRIPTION OF THE DRAWINGS

Preferred examples of the invention will now be described in more detail with reference to the drawing, wherein.

DETAILED DESCRIPTION

Figure 1:
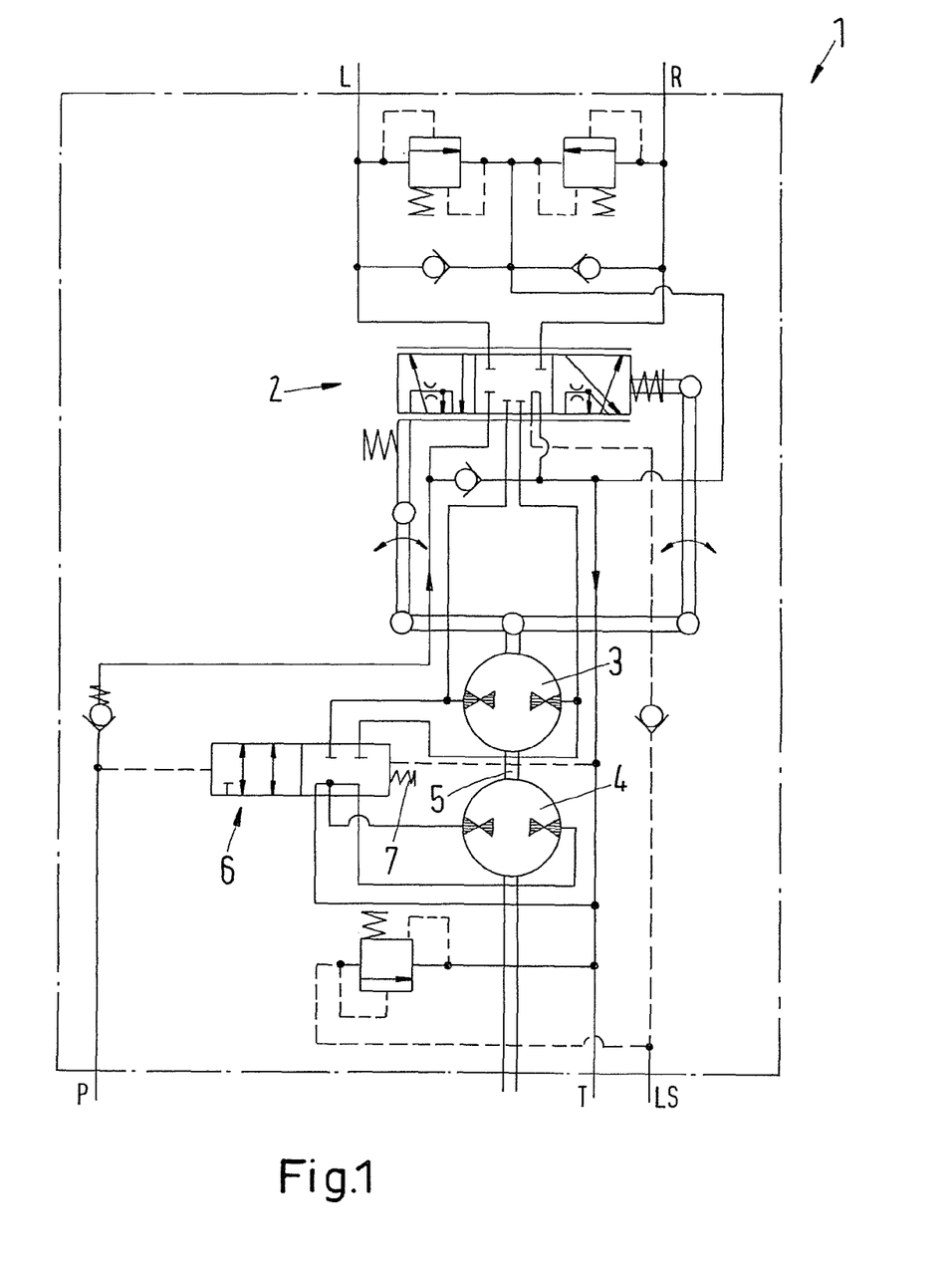
FIG. 1 is a hydraulic circuit of the steering device.

A hydraulic steering device 1 comprises a supply port arrangement having a supply port P and a return port T. Furthermore, the steering device 1 comprises a working port arrangement having two working ports L, R. Direction valve means 2 are arranged between the supply port arrangement P, T and the working port arrangement L, R. In a normal steering mode, i.e. in a steering mode having sufficient pressure at the supply port P, hydraulic fluid delivered to one of the working ports L, R is metered by two fluid meters 3, 4. These fluid meters are connected by a common shaft 5 which usually is a so called "cardan shaft" or "dog bone".

The steering device 1 comprises a load-sensing line LS. Such a load-sensing line LS usually is connected to a pump having a variable displacement. However, it is not an absolute requirement for the steering unit to have a load-sensing and a variable pump. Also a fixed displacement pump can be imagined, and a priority valve can be inserted before the steering device 1.

Selector valve means 6 are provided to switch the steering device 1 between two modes. In the above mentioned "normal steering mode" the two fluid meters 3, 4 are connected in parallel. In the position shown the selector valve means shuts off the fluid meter 4, short circuits this fluid meter 4 and connects this fluid meter 4 to the return port T. This position is used in a so called "emergency mode" in which the pressure of the supply port P is not sufficient to effect steering. The selector valve means 6 are actuated by a pressure of the supply port P in one direction and by the force of spring means 7 in the opposite direction. When the pressure in the supply port P is sufficient to overcome the force of the spring means 7 the steering device 1 is automatically switched in normal steering mode. When the pressure decreases so that the force of the spring means 7 is sufficient to overcome the force created by the pressure at the supply port P the steering device 1 is automatically switched into emergency mode. In the emergency mode the fluid meter 3 acts as auxiliary pump so that a vehicle equipped with the steering device 1 can still be steered.

Such a hydraulic circuit is known per se.

Figure 2:
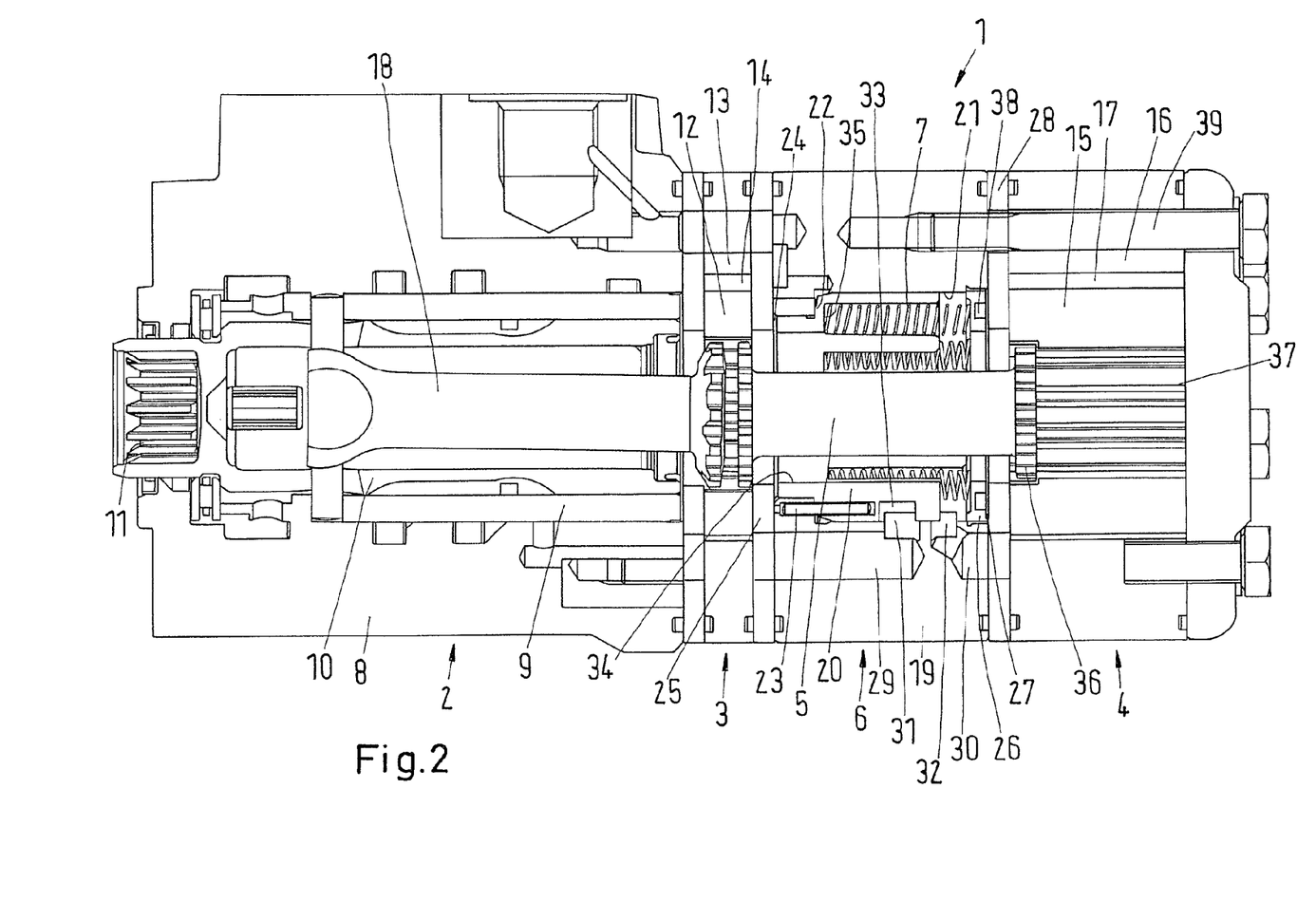
FIG. 2 is a schematic section view of the steering device.

FIG. 2 shows schematically a section of the steering device 1. The same elements are designated with the same numerals as in FIG. 1.

The direction valve means 2 comprise a housing 8, a sleeve 9 rotatably arranged in said housing 8 and a spool 10 rotatingly arranged in the sleeve 9 as it is known in the art. A steering wheel (not shown) can be connected to the spool 10 by means of a connecting geometry 11.

In a manner known per se the fluid meter 3 comprises a star wheel 12 having outer teeth and a star ring 13 having inner teeth the number of the inner teeth being one more than the number of the outer teeth. Pressure chambers 14 are formed between the star wheel 12 and the star ring 13. In this example the fluid meter 3 can have the design of a gerotor. The fluid meter 4 comprises a star wheel 15 and a star ring 16 having the same cross section as the star wheel 12 and the star ring 13 of the fluid meter 3. Pressure chambers 17 are formed between the star wheel 15 and the star ring 16. The only difference between the fluid meter 3 and the fluid meter 4 is that the fluid meter 4 is longer in axial direction providing a larger displacement. Such a design leaves a free choice with regard to the size of the gear wheels (Star wheel 12; 15 and star ring 13; 16), i.e. the ratio of displacement, and allows to define different gearings, such gearings differing e.g. in axial length.

As it is known in the art, when the steering wheel is actuated the spool 10 is rotated relative to the sleeve 9 closing some orifices and opening others. The open orifices allow hydraulic fluid to pass to the two fluid meters 3, 4 which are driven by the fluid so that the star wheels 12, 15 are rotated. The star wheels 12, 15 are connected to each other by means of the shaft 5. The star wheels 12, 15 are connected to the sleeve 9 by means of another cardan shaft 18. The rotation of the star wheels 12, 15 causes the sleeve 9 to be rotated relative to the spool 10 thereby closing the open orifices.

The selector valve means 6 is shown in the same switching mode as in FIG. 1, i.e. in an emergency steering mode.

The selector valve means 6 comprise a housing 19 and a valve element 20. The valve element 20 can slidingly be moved within a bore 21 of the housing 19. This bore 21 shows a step 22 at which the valve element 20 comes to rest when the force of the spring means 7 exceeds the force created by the pressure at the supply port P. A pin 23 is used as rotating preventing means preventing rotation of the valve element 20 in the housing 19.

The position of the step 22 is chosen so that a gap 24 remains between the valve element 20 and a plate 25 separating the fluid meter 3 from the selector valve means 6. In this way a pressure on the fluid meter 3 created by the valve element 20 and the spring means 7 can be avoided thus reducing the risk of wear.

At a side of the valve element 20 opposite to the step 22 a nut 26 is screwed into the housing 19. The nut 26 is used as holding means holding the valve element 20 in the housing 19. The nut 26 comprises an outer thread and the housing 19 comprises an inner thread. The nut 26 can be screwed into the housing to such an extend that a gap or distance 27 remains between the nut 26 and a plate 28 separating the selector valve means 6 from the other fluid meter 4. In this way an unwanted pressure on the fluid meter 4 can be avoided in case the valve element 20 is shifted in a direction towards the second fluid meter 4 when the pressure at the supply port P exceeds the force of the spring means 7.

The housing 19 comprises a plurality of blind channels 29, 30, the number of channels 29, 30 corresponding to the number of pressure chambers 14, 17 in the two fluid meters 3, 4. The blind channels 29, 30 open into the bore 21 with openings 31, 32. The valve element 20 comprises grooves 33 running in axial direction. The number of grooves 33 corresponds to the number of blind channels 29, 30. When the valve element 20 is shifted in the position shown in FIG. 2 the two blind channels 29, 30 of each pair of pressure chambers 14, 17 are separated from each other. When the valve element 20 is shifted in the other position, i.e. in a direction towards the second fluid meter 4, the two blind channels 29, 30 of each pair of pressure chambers 14, 17 are connected by the grooves so that the two fluid meters 3, 4 are connected in parallel.

The shaft 5 extends through the valve element 20. To this end the valve element 20 is provided with a bore 34. This bore shows a step 35. The spring means 7 rest against said step 35 and against the nut 26.

In the embodiment shown in FIG. 2 the spring means 7 comprise a plurality of coil springs which are evenly distributed in circumferential direction. The step 35 can be interrupted in circumferential direction so that there is enough space for the grooves 33.

The embodiment shown has the advantage that the selector valve means 6 can be premounted by inserting the valve element 20 into the bore 21 in the housing 19, mounting the spring means 7 and mounting the nut 26. Such a selector valve means 6 is self-contained and can thus be tested before mounting it in the steering device 1.

The bore 34 in the valve element 20 is large enough to allow a tooth geometry 36 of the shaft 5 to pass wherein such tooth geometry 36 engages a corresponding tooth geometry 37 in the star wheel 15 of the second fluid meter 4.

The nut 26 comprises in its face opposite the spring means 7 a force transmitting geometry 38 which can be realized by a number of blind bores distributed in circumferential direction. A tool can engage this torque transmitting geometry in order to turn the nut 26. In this way it is not necessary to have any geometries protruding over the front face of the nut 26 towards the second fluid meter 4. The selector valve means 6 can be designed with two plane front faces.

The direction valve means 2, the fluid meters 3, 4 and the selector valve means 6 can be clamped together by means of bolts 39.

Figure 3:
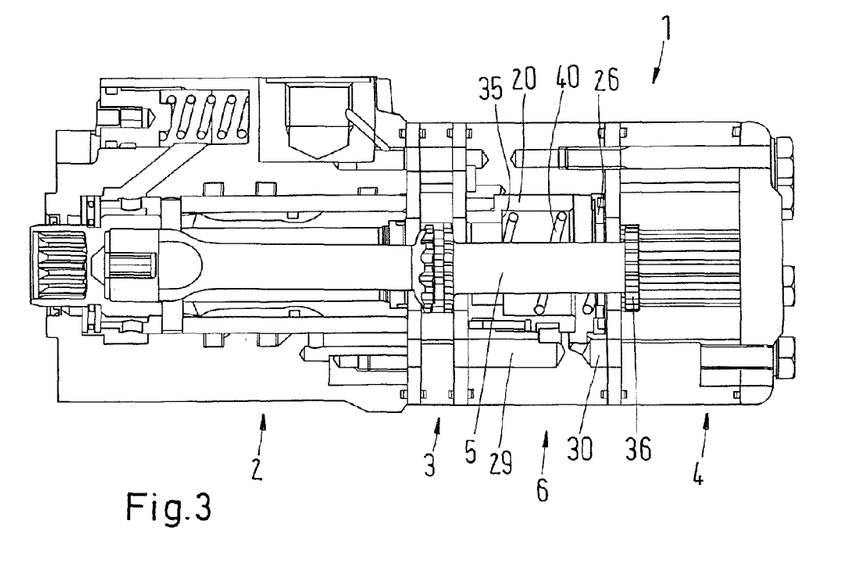
FIG. 3 shows a schematic section of a further embodiment in emergency steering mode.
Figure 4:
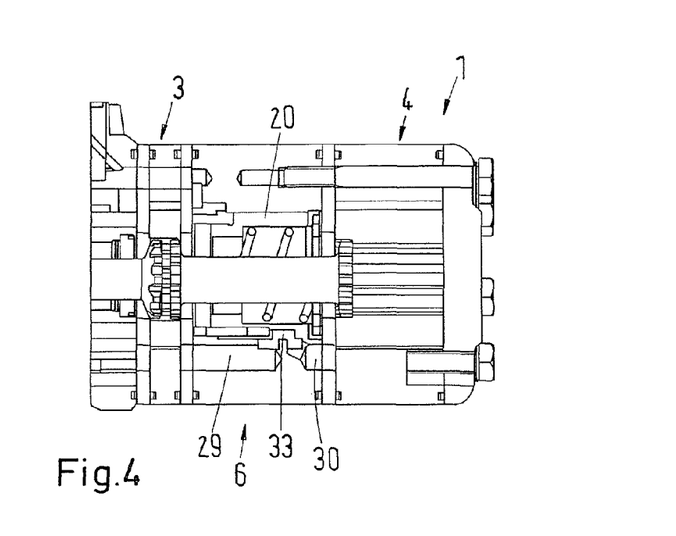
FIG. 4 shows a part of the steering device of FIG. 3 in normal steering mode.

FIGS. 3 and 4 show another embodiment of a steering device 1. Elements corresponding to elements in FIG. 2 are designated with the same reference numerals.

FIG. 3 shows the steering device 1 in emergency steering mode. The valve element 20 being in the same position as in FIG. 1 separating the blind channels 29, 30 from each other.

FIG. 4 shows the selector valve means 6 in normal steering mode in which the valve element 20 by means of its grooves 33 connects the blind channels 29, 30.

The main difference between the embodiments shown in FIG. 2 and FIG. 3, 4, respectively, is that the spring means 7 are realized by a single coil spring 40 resting against the nut 26 and against the step 35 of the valve element 20. The coil spring 40 has an inner diameter which is sufficient to allow the tooth geometry 36 of the shaft 5 to pass.

As it has been described in connection with FIG. 2 the selector valve means 6 can be premounted and tested outside of the steering device 1. Only when the test results are sufficient the selector valve means 6 is mounted in the steering device 1.

Figure 5A:
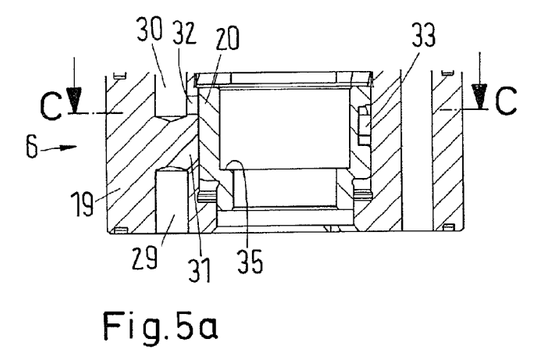
FIG. 5 shows some sections through the selector valve means of the steering device.
Figure 5B:
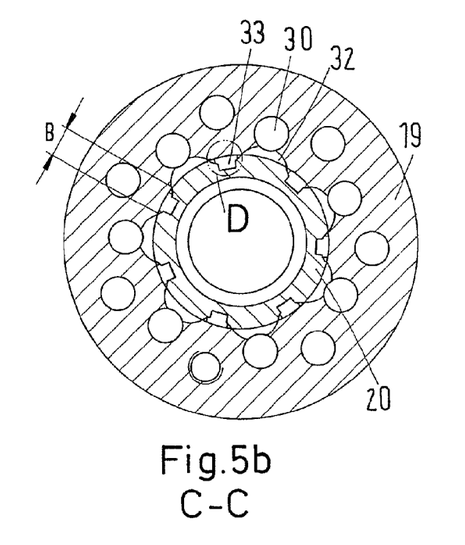
Figure 5C:
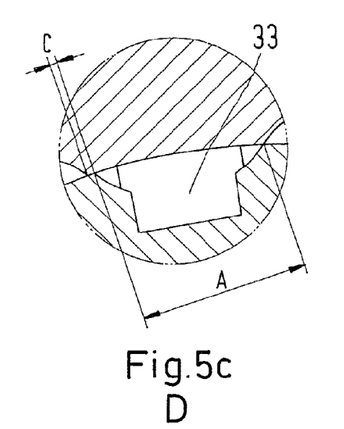

FIG. 5*a* shows some parts of the selector valve means 6. FIG. 5*b* shows a section C-C of FIG. 5*a* and FIG. 5*c* shows a detail D of FIG. 5*b*.

The same numerals are used for the same element shown in FIG. 2-4.

FIG. 5 shows a situation in which the pin 23 has been broken so that the valve element 20 has been rotated within the housing 19. In this case it is not longer possible to connect the blind channels 29, 30 with the help of the grooves 33. However, such a situation could cause another danger: the pressure chamber 14, 17, respectively of the two fluid meters 3, 4 could be short circuited thereby making the steering device 1 inoperative.

In order to avoid this problem the grooves 33 have a width A in circumferential direction which is a bit smaller than a distance B between neighbouring openings 32 in the housing 19. A difference C between the width A and the distance B is sufficient to seal neighbouring openings against each other independently of the rotational position of the valve element 20 within the housing 19. The difference C can be relatively small. It can be a fraction of a millimeter, e.g. 0.3-0.6 mm.

Therefore, even in case of a failure in the rotation prevention, emergency steering auxiliaries will always exist.

In the hydraulic steering device 1 shown in FIG. 1 the selector valve means 6 is actuated by the pressure at the supply port P. However, another possibility (not shown) is to change over the selector valve 6 between the two gears sets in dependence of other parameters, for example the vehicle speed or load, or by means of a valve/function activated by the driver, so that the vehicle, for example, can be turned rapidly at the end of a field. Such a function might be combined with the fact that the emergency steering has first priority if the pressure at the supply port P is no longer available or has been decreased to a pressure not sufficient for performing steering.

Although various embodiments of the present invention have been described and shown, the invention is not restricted thereto, but may also be embodied in other ways within the scope of the subject-matter defined in the following claims.

What is claimed is:

1. A hydraulic steering device comprising:
   a supply port arrangement having a supply port (P) and a return port (T);
   a working port arrangement having two working ports (L, R);
   a direction valve arranged between said supply port arrangement and said working port arrangement;
   a first fluid meter comprising a plurality of first pressure chambers and a first movable metering element;
   a second fluid meter comprising a plurality of second pressure chambers and a second movable metering element;
   a selector valve arranged between the first fluid meter and the second fluid meter, the selector valve comprising a housing and a valve element; and
   a shaft extending through the valve element and connecting the first movable metering element and the second movable metering element;
   wherein the valve element moves between a first position where the first fluid meter and the second fluid meter are separated from each other, and a second position where the first fluid meter and the second fluid meter are connected in parallel; and
   wherein the direction of movement of the valve element from the first position to the second position is parallel to a longitudinal axis of the shaft;
   wherein the housing defines a bore that provides a stop for said valve element, wherein removable holding means are provided preventing said valve element from leaving said bore; and
   wherein said holding means is a nut.

2. The hydraulic steering device according to claim 1, wherein said nut comprises an outer thread being threaded in an inner thread in said housing.

3. The hydraulic steering device according to claim 2, wherein said nut comprises a torque transmitting geometry in a face opposite said valve element.

4. The hydraulic steering device according to claim 2, wherein said valve element rests against said holding means in normal steering mode.

5. The hydraulic steering device according to claim 2, wherein spring means are provided between said holding means and said valve element.

6. The hydraulic steering device according to claim 1, wherein said nut comprises a torque transmitting geometry in a face opposite said valve element.

7. The hydraulic steering device according to claim 6, wherein said valve element rests against said holding means in normal steering mode.

8. The hydraulic steering device according to claim 1, wherein said valve element rests against said holding means in normal steering mode.

9. The hydraulic steering device according to claim 1, wherein spring means are provided between said holding means and said valve element.

10. The hydraulic steering device according to claim 9, wherein said valve element comprise a bore having a step, said spring means resting against said step.

11. The hydraulic steering device according to claim 9, wherein said spring means comprise a single coil spring surrounding said shaft.

12. The hydraulic steering device according to claim 1, wherein said stop stops a movement of said valve element leaving a gap between said valve element and one of the first fluid meter or the second fluid meter next to said valve element in emergency steering mode.

13. The hydraulic steering device according to claim 1, wherein said holding means is fixed in said housing leaving a distance between said holding means and one of the first fluid meter or the second fluid meter next to said valve element in normal steering mode.

14. The hydraulic steering device according to claim 1, wherein rotation preventing means are provided preventing rotation of said valve element in said housing.

15. The hydraulic steering device according to claim 1, wherein said valve element comprise a plurality of grooves in an outer surface of said valve element, each of said plurality of grooves having a width (A) in circumferential direction, said housing comprising a corresponding number of openings in an inner surface facing said outer surface, wherein a distance (B) between openings neighboring each other is larger than said width (A).

16. The hydraulic steering device according to claim 1, wherein the housing defines, a plurality of first blind channels corresponding to the plurality of first pressure chambers and a plurality of second blind channels corresponding to the plurality of second pressure chambers;
   wherein the valve element defines a plurality of grooves; and
   wherein when the valve element is in the first position the plurality of first blind channels are separated from the second blind channels and when the valve element is in the second position the plurality of first blind channels are connected to the plurality of second blind channels by the plurality of grooves so that the first fluid meter and the second fluid meter are connected in parallel.

17. A hydraulic steering device comprising:
   a supply port arrangement having a supply port (P) and a return port (T);
   a working port arrangement having two working ports (L, R);
   a direction valve arranged between said supply port arrangement and said working port arrangement;
   a first fluid meter comprising a plurality of first pressure chambers and a first movable metering element;
   a second fluid meter comprising a plurality of second pressure chambers and a second movable metering element;
   a selector valve arranged between the first fluid meter and the second fluid meter, the selector valve comprising a housing and a valve element; and
   a shaft extending through the valve element and connecting the first movable metering element and the second movable metering element;
   wherein the valve element moves between a first position where the first fluid meter and the second fluid meter are separated from each other, and a second position where the first fluid meter and the second fluid meter are connected in parallel;
   wherein the direction of movement of the valve element from the first position to the second position is parallel to a longitudinal axis of the shaft;

wherein the housing defines a bore that provides a stop for said valve element, wherein removable holding means are provided preventing said valve element from leaving said bore;

wherein spring means are provided between said holding means and said valve element; and wherein said spring means comprise a plurality of coil springs said coil springs being distributed in circumferential direction.

18. A hydraulic steering device comprising:
a supply port arrangement having a supply port and a return port;
a working port arrangement having two working ports;
a direction valve arranged between said supply port arrangement and said working port arrangement;
a first fluid meter and a second fluid meter, each of said first fluid meter and second fluid meter having a movable metering element;
a shaft having an axis;
a selector valve having a valve element shiftable in a direction parallel to said axis, said selector valve comprising a housing, said housing have a bore, said valve element being arranged in said bore; and
a holding means mounted in said housing and configured to prevent said valve element from leaving said bore;
wherein said metering elements of the first and second fluid meters are connected by said shaft;
wherein, in a first position, said selector valve arranges said first and second fluid meters hydraulically in parallel and, in a second position, said selector valve shuts off one of said first fluid meter or second fluid meter;
wherein said selector valve is arranged between said first fluid meter and said second fluid meter;
wherein said shaft extends through the selector valve and said valve element; and
wherein said holding means is adjustable such that a position of said holding means determines a position of said valve element.

* * * * *